United States Patent Office 3,426,358
Patented Feb. 4, 1969

3,426,358
ALKYLATION OF PHENOLS
Hans L. Schlichting, Grand Island, and Anthony D. Barbopoulos and Walter H. Prahl, Buffalo, N.Y., assignors to Hooker Chemical Corporation, Niagara Falls, N.Y., a corporation of New York
No Drawing. Filed Nov. 19, 1965, Ser. No. 508,821
U.S. Cl. 260—621      6 Claims
Int. Cl. C07c 37/16

ABSTRACT OF THE DISCLOSURE

Alkylated phenolic compounds are produced by passing in the vapor phase a mixture of a phenolic compound having at least one reactive position, an alkylating compound, and a small but effective amount of hydrogen halide over an alumina catalyst, and recovering the alkylation product from the reaction mixture. The process is highly selective to the orthoposition.

---

This invention relates to the alkylation of phenol and substituted phenols. More particularly, the invention relates to a catalytic vapor phase alkylation of phenols.

It is known that phenols, such as phenol, cresol, xylenol, resorcinol, pyrogallol, hydroquinone, and the like, may be alkylated by a vapor phase condensation with alcohols, alkyl halides, dialkyl ethers, or olefins, at elevated temperatures, in the presence of alumina as a catalyst. As previously carried out, these alkylations have been subject to considerable by-product formation, low yields, formation of polyalkylated phenols, as well as non-selective substitution.

Selectively substituted phenols are commercially desirable for various applications. For instance, ortho-cresol is used as an intermediary in the production of plastics, antioxidants, and other useful compounds; meta- and para-cresol are useful intermediates for preparing dyes pharmaceuticals, antioxidants, and so forth; and 2,6-xylenol is used as a starting material for polyphenylene oxide plastics and bisxylenol plastics.

It is an object of the present invention to provide an improved process for the alkylation of phenols. Another object of this invention is to provide a process for the alkylation of phenols whereby improved selective positioning of the alkyl substituent in the phenolic molecule is achieved. Other objects of the invention will be apparent from the following detailed description.

In accordance with the practice of the invention it has now been found that excellent yields of selectively alkylated phenols can be obtained when an alumina catalyst containing reaction zone is established to which an alkylating compound and a phenol or phenolic compound are continuously fed under reaction conditions, and fed simultaneously therewith is a small but effective amount of a hydrogen halide. The alkylation product, e.g., the selectively alkylated phenolic compound, is thereafter recovered from the reaction mixture.

From a further description of the invention, it will be readily apparent that the novel process offers numerous advantages. The presence of a minor proportion of a hydrogen halide, under reaction conditions, provides: (1) reactivity at lower temperature, thus reducing undesirable decomposition, improving the yield, and contributing to the longer usefulness of the catalyst; (2) improved direction to monosubstitution over multi-substitution, thus avoiding the formation of more highly substituted tar and residue forming compounds and thereby enhancing the yield of the lower substituted compounds; and (3) an improved selectivity of reaction to ortho-alkylated products of phenols.

Phenolic reactants which may be effectively utilized in the process of the invention are those having not more than 25 carbon atoms, preferably containing 6 to 12 carbon atoms, and also containing at least one reactive position, preferably ortho. Such compounds, for example, may be phenol, isomeric cresols, isomeric xylenols, phenols having substitued thereon one or more alkyl radicals or groups such as ethyl, propyl, isopropyl, butyl, amyl, hexyl, cyclohexyl, heptyl, octyl, nonyl, decyl, and the like. Also included are fused ring phenols, such as naphthols and similar compounds, as well as polyhydric phenols exemplified by resorcinol, pyrogallol and hydroquinone.

The alkylating compounds of the present invention are selected from the group consisting of alkyl alcohols, alkyl halides, alkyl ethers, wherein alkyl is of 1 to 18 carbon atoms, and alkenes of 2 to 18 carbon atoms. It is more preferred to employ those alkyl compounds which have 1 to 10 carbon atoms and those alkenes which have 2 to 10 carbon atoms, and most preferred to employ those having 1 to 6 carbon atoms and 2 to 6 carbon atoms, respectively. Typical examples of these include methanol, ethanol, propanol, isopropyl alcohol, butanol, hexanol, cyclohexanol, heptanol, octanol, decanol, methyl chloride, ethyl chloride, propyl bromide, decyl chloride, dimethyl ether, diethyl ether, ethylene, propylene, butylene, 3,4-dimethyl-2-hexene, and the like.

The alumina catalysts especially useful in the practice of the invention comprise the aluminum oxides having extensive surface areas and great adsorptive capacities. Such alumina may be obtained from natural sources or may be prepared synthetically, as described, for instance, in "Catalysis," vol. I, P. H. Emmett, 327 (1954).

The hydrogen halide employed is most conveniently anhydrous hydrogen chloride gas, but aqueous hydrochloric acid of any concentration to satisfy the required hydrogen chloride concentration in the reaction zone may be used as well. Other suitable hydrogen halides include anhydrous or aqueous hydrogen bromide.

The use of a diluent, such as added steam, may offer advantages in particular cases of highly reactive phenol and alkyl components to reduce and control the rate of reaction. In general, steam in excess of the amounts of water formed in the reaction is not required, although such an excess is considered as within the scope of the present invention.

The phenol reactant of the present invention may be utilized in molar proportions which are stoichiometrically equivalent to the amount of alkylating compound employed or may be utilized in molar proportions which are substantially in excess of the stoichiometric amount. The excess of phenol may be as much as five or more times the stoichiometric amount, preferably three times the stoichiometric amount. It is to be understood, the greater portion of the excess will be present as unreacted phenol in the reaction product and may be recycled to the reaction zone.

The hydrogen halide employed as the catalyst activator may be introduced to the reaction in molar proportions based on a molar proportion of alkylating agent and may range from 0.005:1 to 1:1, preferably 0.01:1 to 0.05:1.

Residence time of the reactants in the reaction zone may be greater than about one minute, but preferably the residence time is maintained between 5 seconds and 20 seconds. Suitable operating temperatures for the reaction may range from 150 degrees centigrade to 350 degrees centigrade, although it is preferred to maintain the temperature in the range of 250 degrees centigrade to 325 degrees centigrade. While the foregoing temperatures represent the preferred temperatures, generally they may vary depending upon the vaporization temperatures of the reactants. Although the pressure of the recation is maintained at atmospheric pressure, it is within the scope of this invention to employ subatmospheric and superatmospheric pressures depending upon the design of the reactor.

The process of the invention may be carried out in any suitable catalytic reaction chamber packed with grains or pellets of alumina catalyst, as such or in combination with carriers, equipped with heating and/or preheating systems, and having a separating and recovery system, such as distillation solumns or extraction columns, whereby recovery of the reaction products and recycling of the unreacted reactants and/or intermediaries may be accomplished.

Advantageously, a vertical column packed with alumina catalyst and adapted to receive the feed stream, for instance, at the top and discharge the effluent at the bottom may be effectively employed. In some instances, it is possible to employ a fluidized bed reactor, wherein the catalyst is in a fluidized form. Additionally, it is within the scope of the invention to utilize other known and convenient methods.

The effluent of the reaction zone is processed so as to separate the alkylation products. Suitable methods for the separation of said reaction product from the reaction mixture include distillation, fractionation or extraction.

It is also within the scope of this invention to process the effluent of the reaction zone so as to separate therefrom the unreacted phenolic compound and the reaction products of lower degree of alkylation than desired and to recycle said compounds to the reaction zone to effect additional alkylation.

The following examples are presented to illustrate further the novelty and utility of the present invention but not with the intention of unduly limiting the same. Unless otherwise indicated, all temperatures are in degrees centigrade and all parts and percentages are by weight.

EXAMPLES 1–3

The advantageous effects of the presence of small amounts of hydrogen chloride on the vapor phase condensation of phenol and methanol in the presence of alumina catalyst to form o-cresol are demonstrated by the following three experiments conducted under the hereinafter mentioned and listed conditions. Only one reaction mixture contained hydrogen chloride in accordance with the present invention. The other two illustrate previously known reaction conditions and results.

Three reactors were each packed with 400 parts of activated alumina granules and placed in electrically heated and controlled salt-baths. A mixture of phenol and methanol (molar proportions PhOH:MeOH=2.85:1) was fed continuously at the same hourly rate (105 parts/hour) through a preheater system into each reactor, over a period of more than 100 hours.

In Experiment 1, a slow stream of HCl gas (about 1.125 parts of gas per hour) was additionally fed to the reactor, while the reaction temperature was kept at 300 degrees centigrade. The effluent streams of all three reactors was collected as condensate and analyzed by gas chromatography. Table I gives the reactants, amounts, and reaction conditions employed as well as giving the results obtained.

TABLE I

| | Example 1 | Example 2 | Example 3 |
|---|---|---|---|
| Total Feed: | | | |
| Phenol | 4,900 parts | 9,400 parts | 9,400 parts. |
| Methanol | 1,120 parts | 1,120 parts | 1,120 parts. |
| HCl gas | 56 parts | | |
| Temperature | 300° C. | 345° C. | 300° C. |
| Feed Rate | 106 parts/hour | 105 parts/hour | 105 parts/hour. |
| Condensate: | | | |
| Water | 630 parts | 630 parts | 630 parts. |
| Phenol | 6,579 parts | 6,580 parts | 6,579 parts. |
| Anisole | 105 parts | 109 parts | 1,080 parts. |
| o-Cresol | 2,490 parts | 1,300 parts | 864 parts. |
| m-Cresol | 110 parts | 530 parts | 325 parts. |
| p-Cresol | 115 parts | 750 parts | 540 parts. |
| Xylenols | 370 parts | 480 parts | 366 parts. |
| High Boilers | 50 parts | 100 parts | 90 parts. |

The reaction temperature of Example 2 was raised to 345 degrees centigrade to obtain a comparable amount of anisole in the effluent. Advantageously, these examples demonstrate that in accordance with the process of the invention (1) the same consumption of methanol was effected at a lower temperature, that is, at 300 degrees centigrade in Example 1 as compared to the 345 degrees centigrade required in Example 2; (2) the percentage of undesired polysubstituted compounds, i.e., xylenols and high boilers, based on mono-substituted and polysubstituted compound produced, was substantially reduced to 13.4 percent in Example 1 as compared to the 18.7 percent produced in Example 2 which was conducted in the absence of hydrogen chloride; (3) a substantial selectivity to ortho-substitution over meta- and para-substitution is clearly shown in Example 1, wherein 91.7 percent of mono-substituted products is o-cresol as compared to 50.4 percent in Example 2 conducted in the absence of hydrogen chloride; and (4) yields of desirable products such as the cresols and xylenols was increased as shown by the reduction of the 3.26 percent yield of high boilers in Example 2 to 1.62 percent yield of high boilers in Example 1 which was conducted in the presence of hydrogen halide.

When a phenolic compound, an alcohol and a hydrogen halide listed below is used in place of the phenol, methanol and hydrogen chloride, respectively, of Example 1, similar ortho-alkylation occurs, producing the corresponding compounds.

Phenolic compound: o-Cresol, m-cresol, p-cresol, 2,5-xylenol, 3,5-xylenol, catechol, resorcinol, hydroquinone.

Alcohol: Ethanol, propanol, butanol, cyclohexanol, hexanol, octanol, decanol, methyl chloride, decyl chloride, methyl ether, ethylene, propylene, isobutylene, 3,4-dimethyl-2-hexene.

Hydrogen halide: Hydrogen bromide.

EXAMPLES 4–6

Employing the procedures described in Examples 2–4, the effects of the presence of small amounts of hydrogen chloride on the vapor phase condensation reaction of o-cresol with methanol to form 2,6-xylenol were demonstrated by the following three experiments. The results are given in Table II. Experiment #4 illustrates the process conditions in accordance with the present invention, while Experiments #5 and #6 illustrate previously known reaction conditions and results. The effluent streams of all three reactors was collected as condensate and analyzed by gas chromatography.

was treated to recover the 2,6-xylenol as product.

Advantageously, 87 percent of the xylenols formed was 2,6-xylenol. The yield of 2,6-xylenol expressed as a per-

TABLE II

|  | Example 4 | Example 5 | Example 6 |
|---|---|---|---|
| Total Feed: | | | |
| o-Cresol | 10,800 parts | 10,800 parts | 10,800 parts. |
| Methanol | 1,120 parts | 1,120 parts | 1,120 parts. |
| HCl gas | 56 parts | | |
| Temperature | 300° C | 350° C | 300° C. |
| Feed Rate | 106 parts/hour | 105 parts/hour | 105 parts/hour. |
| Condensate: | | | |
| Water | 630 parts | 630 parts | 630 parts. |
| o-Cresol | 7,580 parts | 7,578 parts | 7,581 parts. |
| o-Methyl-anisole | 60 parts | 75 parts | 1,220 parts. |
| 2,6-xylenol | 2,560 parts | 1,465 parts | 918 parts. |
| 2,3-xylenol | 122 parts | 250 parts | 182 parts. |
| 2,4-xylenol | 480 parts | 1,100 parts | 730 parts. |
| 2,5-xylenol | 120 parts | 370 parts | 306 parts. |
| High Boilers | 290 parts | 410 parts | 350 parts. |

The reaction temperature of Example 5 was raised to 345 degrees centigrade to obtain a comparable amount of o-methyl-anisole in the effluent. Advantageously, Examples 4–6 demonstrate that in accordance with the process of the invention (1) the same consumption of methanol was obtained at a lower temperature, that is, at 300 degrees centigrade in Example 4 as compared to the 350 degrees centigrade required in Example 5; (2) the percentage of undesired polysubstituted compounds, i.e., high boilers, based on monosubstituted compounds, i.e., 2,6-, 2,3-, 2,4-, and 2,5-xylenols, and undesired polysubstituted compounds, was substantially reduced to 8.1 percent in Example 4 as compared to the 11.4 percent produced in Example 5 conducted in the absence of hydrogen chloride; (3) a substantial selectivity to ortho-substitution over meta- and para-substitution is clearly shown by Example 4, wherein 78.0 percent of the monosubstituted product is 2,6-xylenol, as compared to 46.0 percent in Example 5 conducted in the absence of hydrogen chloride; and (4) yields of desirable products, i.e., xylenols was increased as shown by the reduction of the 11.4 percent yield of high boilers in Example 5 to 8.1 percent yield of high boilers in Example 4 which was conducted in the presence of hydrogen halide.

If it is desired to introduce more than one alkyl substituent to the phenolic compound, it is possible to achieve this result by operating in several steps, that is, isolating the partially alkylated intermediate and using it as the starting material in a subsequent alkylation operation. However, the preferred method comprises a one step operation accomplished by the internal recycling of the intermediate as illustrated by the Example 7 describing the production of 2,6-xylenol directly from phenol.

EXAMPLE 7

This example was conducted employing the procedure of Examples 2–4. The feed to the reactor was modified to consist of 2820 parts of phenol, 1920 parts of methanol and 95 parts of hydrogen chloride gas. In addition, 6580 parts of phenol, 12,900 parts of o-cresol, 110 parts of anisole, 60 parts of methylanisole all recovered from the effluent were recycled to the reaction zone. The reaction temperature was maintained at 300 degrees centigrade, and the feed rate was 105 parts per hour.

| Condensate: | Parts |
|---|---|
| Water | 1,080 |
| Phenol | 6,580 |
| o-Cresol | 12,900 |
| Anisole | 110 |
| Methyl-anisole | 60 |
| m-Cresol | 105 |
| p-Cresol | 160 |
| 2,6-xylenol | 2,580 |
| Other xylenols | 370 |
| High boilers | 250 |

The portion of the effluent consisting of phenol, o-cresol, anisole and methylanisole was isolated and recycled, while the portion consisting of 2,6-xylenol and high boilers centage of all the substituted phenols formed is 74 percent.

From the foregoing description and examples, it is apparent that various modifications are possible within the scope of this invention and it is therefore not to be construed as limiting the invention except as defined by the appended claims.

What is claimed is:

1. The process for the production of alkylated phenolic compounds comprising passing in the vapor phase at a temperature between about 150 degrees centigrade and about 350 degrees centigrade, a mixture of methanol, a small but effective amount of a hydrogen halide selected from the group consisting of hydrogen chloride and hydrogen bromide in molar proportions based on alkylating compounds ranging from 0.005:1 to 1:1, and a stoichiometric excess of a phenolic compound selected from the group consisting of phenol and o-cresol, over an alumina catalyst, and recovering the alkylation product from the reaction mixture.

2. A process in accordance with claim 1 wherein the unreacted phenolic compound and the reaction products of lower degree of alkylation than desired are recycled over the alumina catalyst.

3. A process in accordance with claim 1 wherein the phenolic compound is phenol.

4. A process in accordance with claim 1 wherein the phenolic compound is o-cresol.

5. The process for the production of o-cresol comprising passing in the vapor phase at a temperature of between about 150 degrees cntigrade and about 350 degrees centigrade, a mixture of methanol, a small but effective amount of hydrogen chloride in a molar proportion based on alkylating compound ranging from 0.005:1 to 1:1, and a stoichiometric excess of phenol, over an alumina catalyst, and recovering o-cresol.

6. The process for the production of 2,6-xylenol comprising passing in the vapor phase at a temperature between about 150 degrees centigrade and about 350 degrees centigrade a mixture of methanol, a small but effective amount of hydrogen chloride in a molar proportion between about 0.005:1 to 1:1, and a stoichiometric excess of phenol and o-cresol, over an alumina catalyst, and recovering 2,6-xylenol.

References Cited

UNITED STATES PATENTS 2,430,190  11/1947  Schmerling et al.
2,448,942   9/1948  Winkler et al. _____ 260—621

LEON ZITVER, *Primary Examiner.*

H. ROBERTS, *Assistant Examiner.*

U.S. Cl. X.R.

260—624, 625, 626